(12) United States Patent
Okayama et al.

(10) Patent No.: US 10,861,181 B2
(45) Date of Patent: Dec. 8, 2020

(54) INFORMATION PROCESSING APPARATUS AND INFORMATION PROCESSING METHOD

(71) Applicant: SONY CORPORATION, Tokyo (JP)

(72) Inventors: Takahiro Okayama, Tokyo (JP); Ryo Fukazawa, Kanagawa (JP); Kuniaki Torii, Kanagawa (JP); Kazuomi Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 143 days.

(21) Appl. No.: 16/086,758

(22) PCT Filed: Feb. 24, 2017

(86) PCT No.: PCT/JP2017/007239
§ 371 (c)(1),
(2) Date: Sep. 20, 2018

(87) PCT Pub. No.: WO2017/169400
PCT Pub. Date: Oct. 5, 2017

(65) Prior Publication Data
US 2019/0066325 A1   Feb. 28, 2019

(30) Foreign Application Priority Data
Mar. 29, 2016   (JP) ................. 2016-065218

(51) Int. Cl.
*G06K 9/00* (2006.01)
*G06T 7/70* (2017.01)
(Continued)

(52) U.S. Cl.
CPC .............. *G06T 7/70* (2017.01); *G06F 3/01* (2013.01); *G06F 3/038* (2013.01); *G06F 3/0481* (2013.01);
(Continued)

(58) Field of Classification Search
CPC .......... G06F 3/01; G06F 3/038; G06F 3/0481; G06F 3/04842; G06F 3/04845; G06K 9/00342; G06T 7/70
See application file for complete search history.

(56) References Cited

U.S. PATENT DOCUMENTS

2012/0313963 A1* 12/2012 Chen-Quee ............. G06F 3/147
                                                                    345/593
2013/0194627 A1   8/2013 Nishiguchi
(Continued)

FOREIGN PATENT DOCUMENTS

CA       2905506      *  9/2014  ......... G02B 27/0093
JP    2006-119297 A      5/2006
(Continued)

OTHER PUBLICATIONS

International Search Report and Written Opinion of PCT Application No. PCT/JP2017/007239, dated Apr. 18, 2017, 12 pages of ISRWO.

*Primary Examiner* — Amara Abdi
(74) *Attorney, Agent, or Firm* — Chip Law Group

(57) ABSTRACT

An information processing apparatus including a processing unit that selects a display object from among a plurality of candidate objects corresponding to a specific position in a visual field of a user and performs display control processing of causing the selected display object to be displayed on a display screen in association with the specific position on a basis of line-of-sight information showing a line of sight of the user.

17 Claims, 8 Drawing Sheets

(51) Int. Cl.
*G06F 3/01* (2006.01)
*G06F 3/038* (2013.01)
*G06F 3/0481* (2013.01)
*G06F 3/0484* (2013.01)

(52) U.S. Cl.
CPC ...... *G06F 3/04842* (2013.01); *G06F 3/04845* (2013.01); *G06K 9/00342* (2013.01)

(56) References Cited

U.S. PATENT DOCUMENTS

2014/0146075 A1    5/2014  Takasu
2017/0160550 A1*   6/2017  Kobayashi ........... G02B 27/017

FOREIGN PATENT DOCUMENTS

| JP | 2006119297   | * | 5/2006 | ............... G09G 5/00 |
| JP | 2013-156806 A |  | 8/2013 | |
| JP | 2014-106445 A |  | 6/2014 | |
| JP | 2016-173693 A |  | 9/2016 | |

* cited by examiner

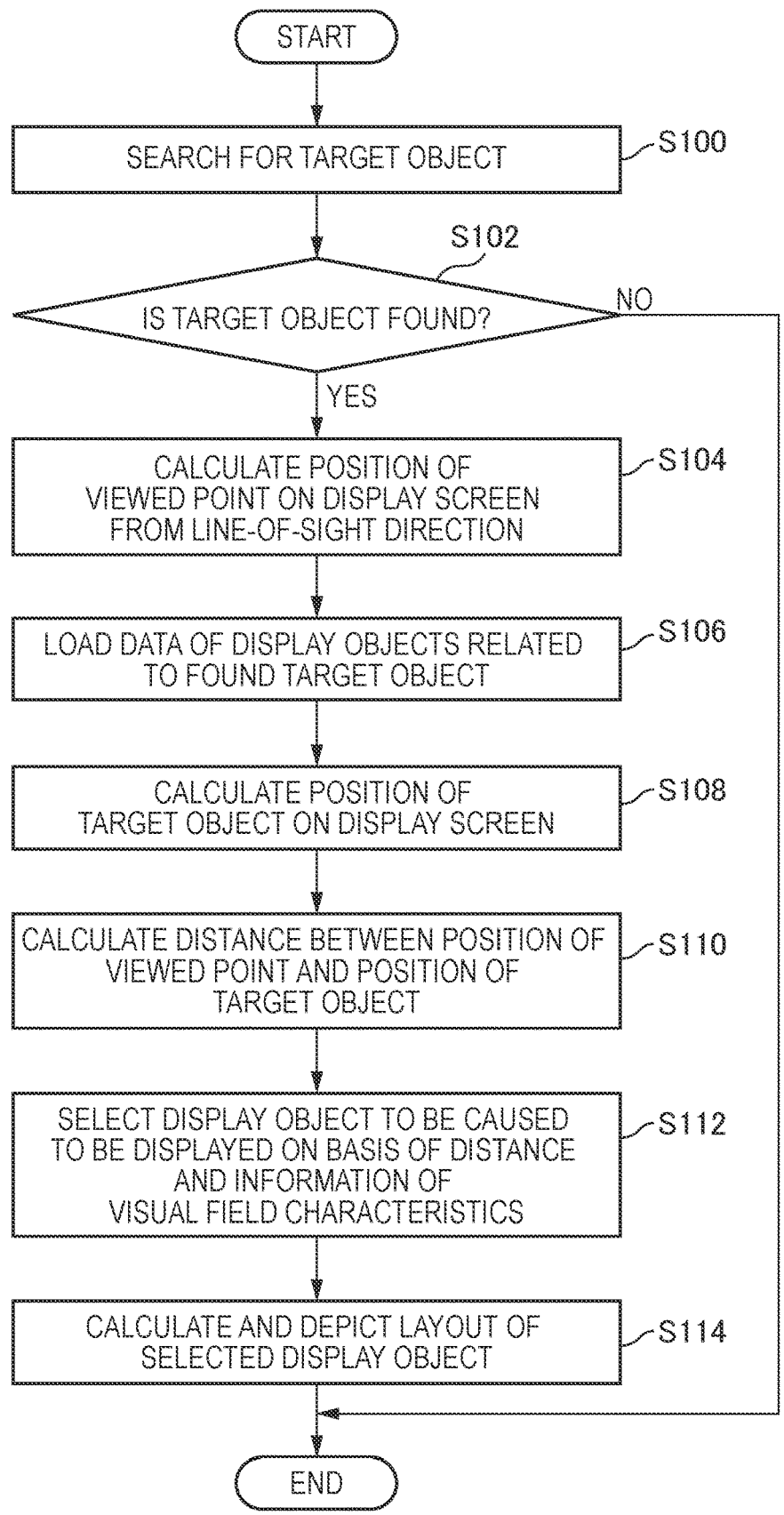

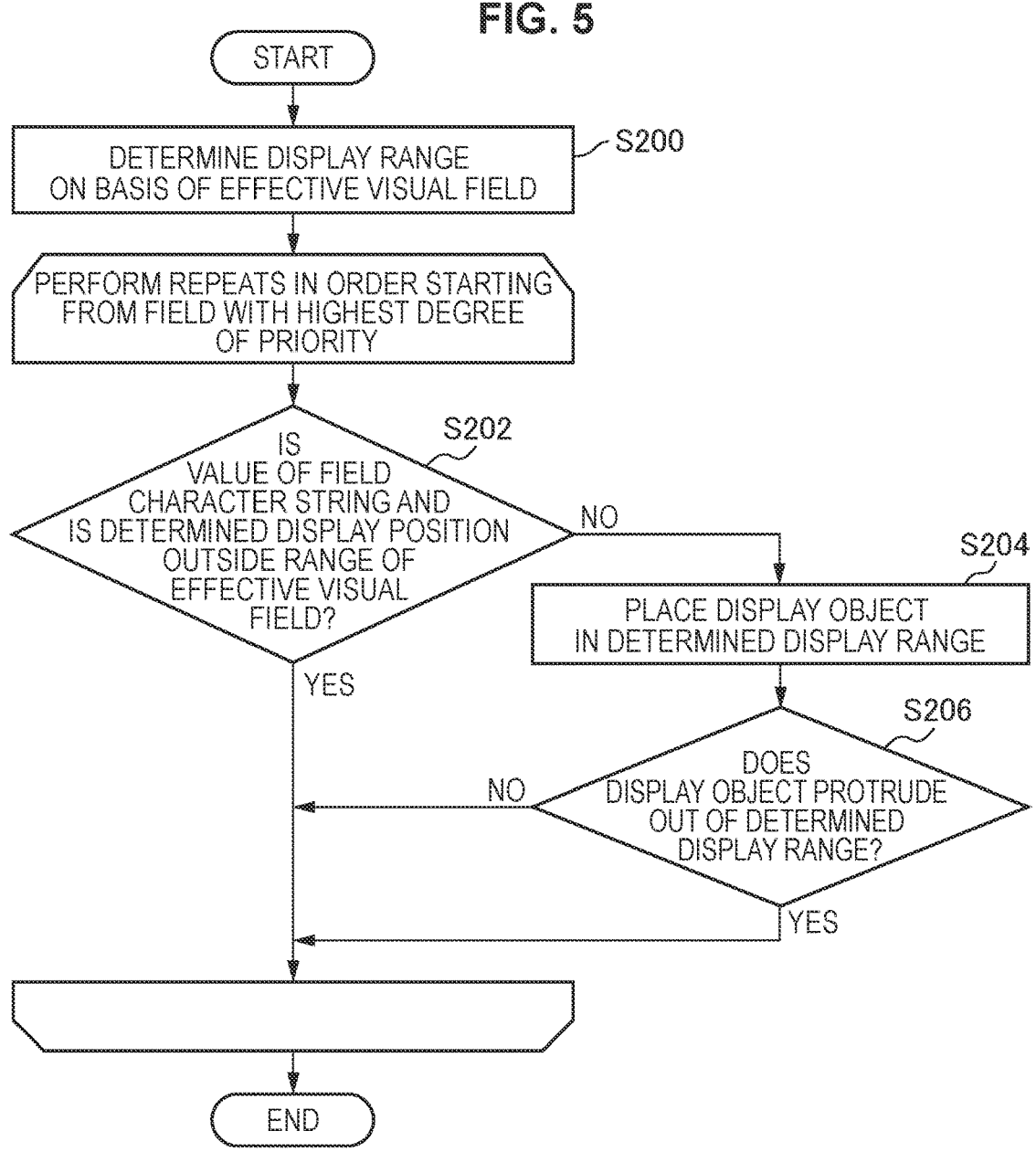

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/007239 filed on Feb. 24, 2017, which claims priority benefit of Japanese Patent Application No. JP 2016-065218 filed in the Japan Patent Office on Mar. 29, 2016. Each of the above-referenced applications is hereby incorporated herein by reference in its entirety.

TECHNICAL FIELD

The present disclosure relates to an information processing apparatus, an information processing method, and a computer-readable medium.

BACKGROUND ART

A technology that assesses a display position corresponding to the position of the line of sight of a user and causes display to be performed in a position based on the assessed display position is developed. For example, the technology described in Patent Literature 1 below is given as a technology that assesses a display position on the basis of the position of the line of sight of a driver of a vehicle and visual field characteristics and causes alert display to be performed in the assessed display position or the vicinity of the display position.

CITATION LIST

Patent Literature

Patent Literature 1: JP H7-329657A

DISCLOSURE OF INVENTION

Technical Problem

Various display objects showing characters (or character strings; the same applies hereinafter) and images, combinations of these, etc. can be displayed on a display screen while being superimposed on a real space (or an image showing a real space, such as a captured image in which a real space is imaged; the same applies hereinafter) by using augmented reality (AR) technology or the like, for example.

Further, in a case where a display object is superimposed on a real space like above, there are needs to allow the user to recognize the substance shown by the superimposed display object more easily.

The present disclosure proposes a new and improved information processing apparatus, a new and improved information processing method, and a new and improved computer-readable medium that can facilitate the recognition of a display object by a user.

Solution to Problem

According to the present disclosure, there is provided an information processing apparatus. The information processing apparatus includes: a processing unit configured to select a display object from among a plurality of candidate objects corresponding to a specific position in a visual field of a user and to perform display control processing of causing the selected display object to be displayed on a display screen in association with the specific position on a basis of line-of-sight information showing a line of sight of the user.

Further, according to the present disclosure, an information processing method including executing display control processing by an information processing apparatus is provided. The display control processing selects a display object from among a plurality of candidate objects corresponding to a specific position in a visual field of a user on a basis of line-of-sight information showing a line of sight of the user, and causes the selected display object to be displayed on a display screen in association with the specific position.

In addition, according to the present disclosure, there is provided a computer-readable medium including: an instruction operable on an information processing apparatus so as to execute an information processing method. The information processing method includes executing display control processing of selecting a display object from among a plurality of candidate objects corresponding to a specific position in a visual field of a user on a basis of line-of-sight information showing a line of sight of the user, and causing the selected display object to be displayed on a display screen in association with the specific position.

Advantageous Effects of Invention

According to the present disclosure, the recognition of a display object by a user can be facilitated.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a flow chart showing an example of processing according to the information processing method according to the present embodiment.

FIG. 5 is a flow chart showing an example of processing according to the information processing method according to the present embodiment.

FIG. 6 is an explanatory diagram for describing an example of processing according to the information processing method according to the present embodiment.

MODE(S) FOR CARRYING OUT THE INVENTION

Figure 1:
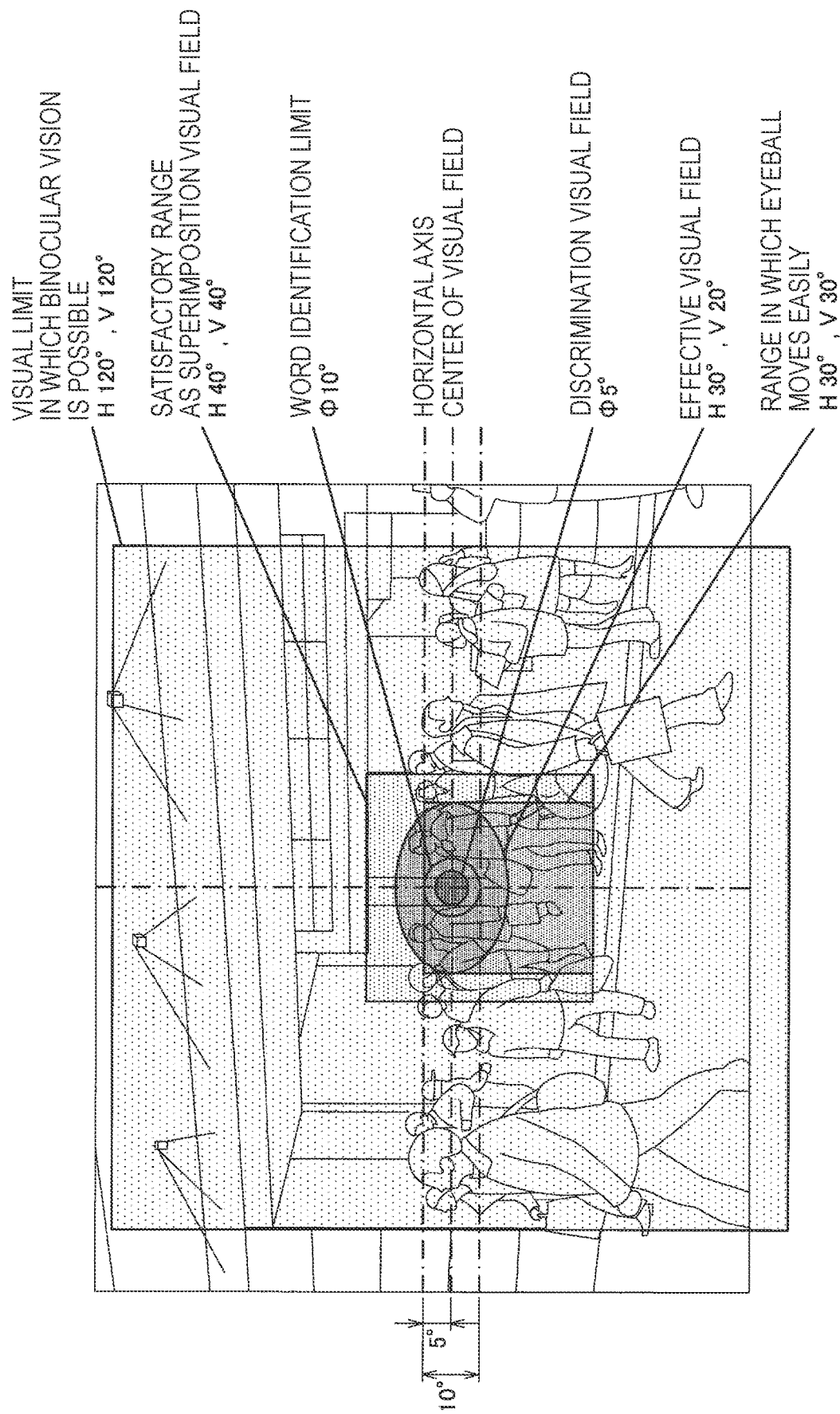
FIG. 1 is an explanatory diagram for describing an example of an information processing method according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in the following, the description is given in the order shown below.
1. Information processing method according to present embodiment
2. Information processing apparatus according to present embodiment
3. Computer-readable medium according to present embodiment
(Information Processing Method According to Present Embodiment)

First, an information processing method according to the present embodiment is described. In the following, the information processing method according to the present embodiment is described using, as an example, a case where processing according to the information processing method according to the present embodiment is performed by an information processing apparatus according to the present embodiment.

[1] Outline of Information Processing Method According to Present Embodiment

FIG. 1 is an explanatory diagram for describing an example of the information processing method according to the present embodiment, and shows an example of visual field characteristics of a person. Here, "H" shown in FIG. 1 represents the horizontal direction, and "V" shown in FIG. 1 represents the vertical direction. Further, "y" shown in FIG. 1 represents the directional angle of the line-of-sight direction.

The visual field characteristics of a person can be classified as follows, for example.
- A discrimination visual field: a range in which a person can recognize the shape and the substance of an arbitrary kind of display object.
- A word identification limit: a limit range in which a person can read a character (an example of the display object).
- An effective visual field: a range in which a person can identify the shape of a display object other than characters (an example of the display object).
- Other ranges (ranges other than the discrimination visual field, the word identification limit, or the effective visual field): ranges in which neither the shape nor the substance of a display object can be identified but the movement of a display object based on animation display or the like of the display object can be noticed.

Note that it may be assumed that the distance (corresponding to the directional angle) from the position of the viewed point of a user to the word identification limit or to the boundary of the effective visual field is defined as a "first value." Further, it may be assumed that, for the position of the viewed point of the user, a distance showing a satisfactory range as a superimposition visual field or a distance showing the visual limit in which binocular vision is possible is defined as a "second value." It may be assumed that the information processing apparatus according to the present embodiment selects a display object corresponding to a specific position (a target object) from among a plurality of candidate objects on the basis of the assessment of whether the distance between the position of the viewed point and the specific position is less than or equal to the first value or whether the distance is larger than the first value and less than or equal to the second value. Details are described later with reference to FIG. 5.

In a case where, for example, the technology described in Patent Literature 1 is used, alert display is performed while the range inside the discrimination visual field is taken as a proper display position associated with the position of the line of sight. Here, as shown above, the user can recognize the shape and the substance of an arbitrary kind of display object in the discrimination visual field. Hence, for example, if alert display is performed in the discrimination visual field like in the technology described in Patent Literature 1, there is a possibility that the user can be caused to recognize the substance of the alert display.

Here, for example, a use case where a display object corresponding to a target object included in a real space is caused to be displayed on a display screen while being superimposed on the real space is envisaged. Note that it may be assumed that the target object corresponds to a specific position in the visual field of the user.

Examples of the display screen according to the present embodiment include display screens of an eyewear-type wearable device (hereinafter, occasionally referred to as simply an "eyewear device"), such as an eyeglass-type wearable device, and a wearable device used by being mounted on the user's head, such as a head-mounted display (HMD). The HMD may be a transmission-type device, or may be a non-transmission-type apparatus. As the transmission type, arbitrary types such as a video transmission type in which an image captured by an imaging device is caused to be displayed on a display screen and thereby the outside scenery is shown electronically and an optical transmission type are given. Further, examples of the display system for achieving the transmission type include arbitrary display systems that can achieve the transmission type, such as a hologram system, a half mirror system, and a pupil division system.

Further, the display screen according to the present embodiment may be a display screen of an arbitrary device such as a smartphone or a tablet, for example.

Examples of the target object according to the present embodiment include a living thing such as a person, an object, etc.

The target object according to the present embodiment is identified by processing using an arbitrary recognition technology such as face recognition technology or object recognition technology being performed on a captured image, for example.

Further, the target object according to the present embodiment may be identified by using position information showing the position of the user and a database in which positions and target objects are linked together, for example. Examples of the position information include position data obtained by a position identifying device included in an apparatus for the display screen according to the present embodiment and position data obtained by an external position identifying device connected to an apparatus for the display screen according to the present embodiment. Examples of the position identifying device include an arbitrary device that can identify the position, such as a device for the Global Navigation Satellite System (GNSS).

Examples of the display object according to the present embodiment include an arbitrary display object that can be displayed on the display screen, such as a character and an image (a moving image or a still image), and a combination of these. Specific examples of the display object according to the present embodiment include the examples shown below. Note that it goes without saying that the example of the display object according to the present embodiment is not limited to the specific examples shown below.

- a text label (for example, a character string of less than or equal to a set number of characters)
- a composition (for example, a character string in which the number of characters is larger than a set number of characters)
- an unanimated icon
- an animated icon
- a photograph
- a thumbnail of a photograph
- a moving image In a case where a use case like that mentioned above is envisaged, even if a display object corresponding to a target object is caused to be displayed in the discrimination visual field of the user, there is a concern that the user cannot easily grasp the relationship between the display object and the target object or the substance of the display object. Specific examples include a concern that the user cannot easily grasp the relationship between the display object and the target object or the substance of the display object in cases like below.

- a case where a plurality of target objects exist and a plurality of display objects individually corresponding to the target objects are caused to be displayed (a case where the amount of information that is caused to be displayed is large)
- a case where the target object is in the other ranges mentioned above Hence, in a case where a display object corresponding to a target object is caused to be displayed, it is not necessarily the case that "always causing the display object to be displayed in the discrimination visual field of the user is a desirable method for displaying the display object."

Thus, the information processing apparatus according to the present embodiment performs "processing of causing a display object that is selected from among a plurality of candidates for the display object (candidate objects) corresponding to a target object on the basis of line-of-sight information to be displayed" (hereinafter, occasionally referred to as "display control processing"). Alternatively, it may be assumed that the information processing apparatus according to the present embodiment is one that performs "display control processing of selecting a display object from among a plurality of candidate objects corresponding to a specific positions in the visual field of the user and causing the selected display object to be displayed on a display screen in association with the specific position."

Further, the manner of display of the display object that the information processing apparatus according to the present embodiment causes to be displayed by display control processing changes on the basis of line-of-sight information.

Here, the line-of-sight information according to the present embodiment is data showing the line of sight of the user. Examples of the line-of-sight information according to the present embodiment include "data showing the position of the line of sight of the user" and "data that can be used for the identification of the position of the line of sight of the user (or data that can be used for the inference of the position of the line of sight of the user; the same applies hereinafter)."

Examples of the data showing the position of the line of sight of the user according to the present embodiment include "coordinate data showing the position of the line of sight of the user on the display screen." The position of the line of sight of the user on the display screen is shown by coordinates in a coordinate system with the origin at a reference position on the display screen, for example. The reference position on the display screen according to the present embodiment may be a fixed position set in advance, or may be a position that can be set on the basis of the user's operation or the like, for example.

In a case where information regarding the position of the line of sight of the user according to the present embodiment is coordinate data showing the position of the line of sight of the user on the display screen, the information processing apparatus according to the present embodiment acquires coordinate data showing the position of the line of sight of the user on the display screen from an external apparatus that has identified (or inferred) the position of the line of sight of the user by using line-of-sight detection technology, for example. Further, in the above case, the information processing apparatus according to the present embodiment may acquire coordinate data showing the position of the line of sight of the user on the display screen by identifying (or inferring) the position of the line of sight of the user by using line-of-sight detection technology, for example.

Examples of the line-of-sight detection technology according to the present embodiment include a method that detects the line of sight on the basis of the position of a movable point of the eye (for example, a point corresponding to a movable portion of the eye, such as the iris and the pupil) with respect to a reference point of the eye (for example, a point corresponding to an immovable portion of the eye, such as the inner canthus and a corneal reflex). Note that the line-of-sight detection technology according to the present embodiment is not limited to the above. For example, the information processing apparatus according to the present embodiment or an external apparatus may detect the line of sight of the user by using an arbitrary line-of-sight detection technology using "a corneal reflex method" such as "a pupil corneal reflex method," "a sclera reflex method," "an active appearance model (AAM) that detects a face and then follows a feature point obtained from the eye, the nose, the mouth, etc.," or the like.

Note that the data showing the position of the line of sight of the user according to the present embodiment are not limited to "coordinate data showing the position of the line of sight of the user on the display screen" mentioned above.

For example, in a case where the user wears a transmission-type eyewear device or HMD or in like cases, the data showing the position of the line of sight of the user according to the present embodiment may be "coordinate data showing the position in a real object in a real space seen by the user."

The position in a real object in a real space seen by the user is identified (or inferred) on the basis of a three-dimensional image of the real object and a line-of-sight vector identified (or inferred) by using line-of-sight detection technology, for example. Note that the method for identifying the position in a real object in a real space seen by the user is not limited to the above, and an arbitrary technology that can identify the position in a real object in a real space seen by the user may be used.

In a case where information regarding the position of the line of sight of the user according to the present embodiment is coordinate data showing the position in a real object in a real space seen by the user, the information processing apparatus according to the present embodiment acquires coordinate data showing the position in the real object in the real space seen by the user from an external apparatus, for example. Further, in the above case, the information processing apparatus according to the present embodiment may acquire coordinate data showing the position in the real object in the real space seen by the user by identifying (or inferring) the position in the real object in the real space seen by the user by using line-of-sight detection technology or the like, for example.

Further, examples of the data that can be used for the identification of the position of the line of sight of the user according to the present embodiment include captured image data in which the side on which an image is displayed on the display screen is imaged (captured image data in which the side facing the display screen is imaged from the display screen side). Further, the data that can be used for the identification of the position of the line of sight of the user according to the present embodiment may further include detection data of an arbitrary sensor that obtains a detection value that can be used to improve the inference accuracy of the position of the line of sight of the user, such as detection data of an infrared sensor that detects infrared light on the side on which an image is displayed on the display screen.

Further, the data that can be used for the identification of the position of the line of sight of the user according to the present embodiment may be a three-dimensional image of a real object and data for the identification of a line-of-sight vector of the user, for example.

In a case where, for example, data that can be used for the identification of the position of the line of sight of the user are used, the information processing apparatus according to the present embodiment performs, for example, processing for a method for identifying the position of the line of sight of the user according to the present embodiment like that mentioned above, and identifies (or infers) the position of the line of sight of the user.

Figure 2B:
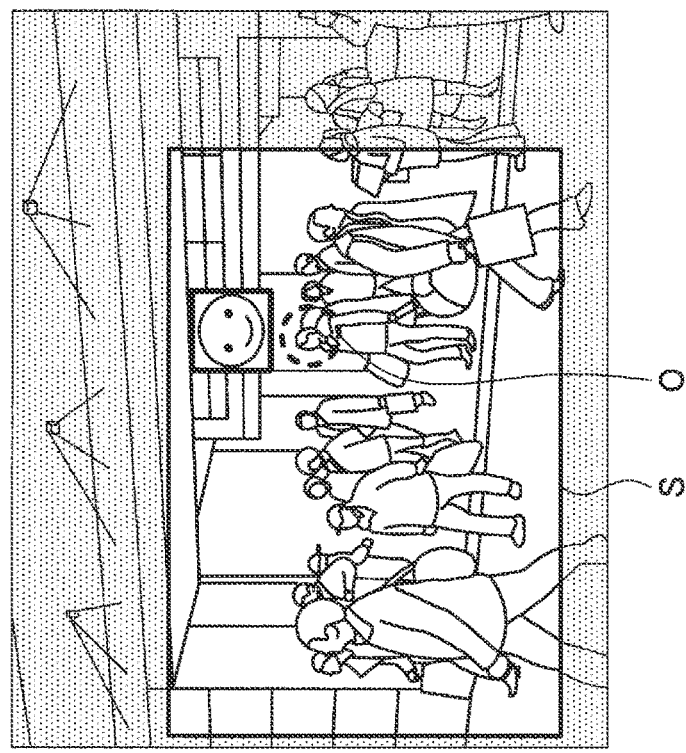
FIGS. 2A and 2B are explanatory diagrams for describing an example of an information processing method according to the present embodiment.
Figure 2A:
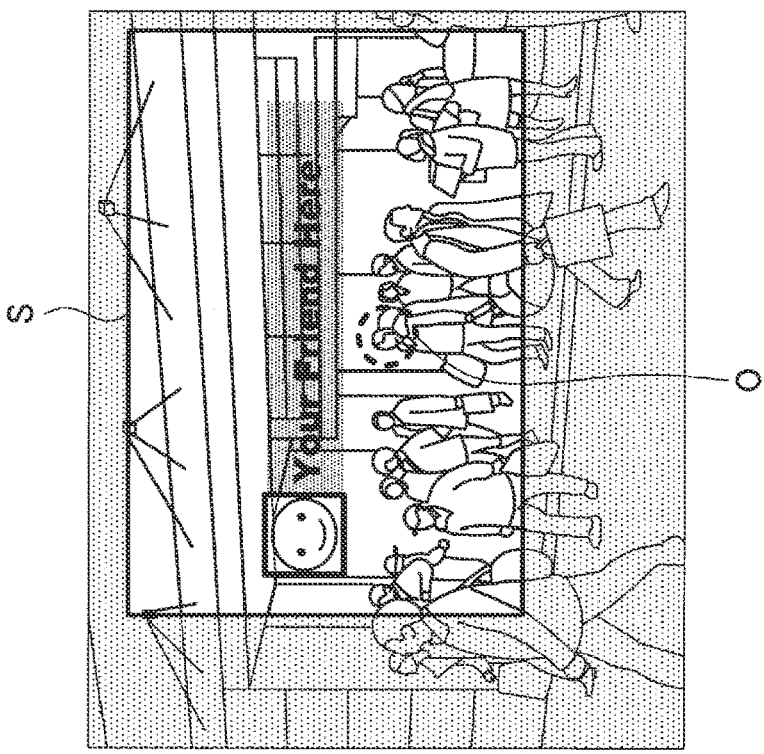

FIGS. 2A and 2B are explanatory diagrams for describing examples of the information processing method according to the present embodiment, and shows examples in which the manner of display of the display object changes on the basis of line-of-sight information.

FIG. 2A shows an example of a display object displayed for a target object O on a display screen S. Further, FIG. 2B shows another example of a display object displayed for a target object on a display screen S.

The display screen S of FIG. 2A and the display screen S of FIG. 2B show display screens of an HMD (examples of the display screen of a wearable device used by being mounted on the user's head), for example. Further, in FIGS. 2A and 2B, it is assumed that the line of sight of the user is directed to around the center of the display screen S.

A case where the display object corresponding to the target object O is caused to be displayed above the target object O on the display screen S is used as an example.

In a case where, for example as shown in FIG. 2A, the target object O exists ahead of the line of sight of the user, the information processing apparatus according to the present embodiment causes "a combination of an icon (an example of the image; the same applies hereinafter) and characters" (an example of the display object corresponding to the target object O) to be displayed on the display screen S, for example.

Here, in view of the visual field characteristics of a person described above, it is difficult for the user to identify a character in a range that is neither the discrimination visual field nor the word identification limit. Hence, in the example shown in FIG. 2A, the information processing apparatus according to the present embodiment causes the characters to be displayed in the word identification limit, and causes the icon to be displayed in the effective visual field, for example.

Further, in a case where, for example as shown in FIG. 2B, the target object O does not exist ahead of the line of sight of the user, the "icon" (another example of the display object corresponding to the target object O) is displayed on the display screen S.

Here, in a case where the target object O does not exist ahead of the line of sight of the user as shown in FIG. 2B, even if a display object similar to that of FIG. 2A is caused to be displayed, it is difficult for the user to recognize the displayed characters. Further, in the other ranges, it is difficult for the user to identify the shape of the display object. Hence, in the example shown in FIG. 2B, the information processing apparatus according to the present embodiment causes the icon to be displayed in the effective visual field, for example.

The information processing apparatus according to the present embodiment changes the manner of display of the display object on the basis of the line of sight of the user shown by line-of-sight information, in view of visual field characteristics, for example as shown in FIGS. 2A and 2B.

By the change of the manner of display of the display object, for example as shown in FIGS. 2A and 2B, the time it takes for the user to recognize the display object displayed on the display screen S can be made shorter.

Hence, the information processing apparatus according to the present embodiment can facilitate the recognition of the display object by the user.

[2] Processing According to Information Processing Method According to Present Embodiment Next, processing according to the information processing method according to the present embodiment is described more specifically.

As described above, the information processing apparatus according to the present embodiment performs display control processing ("processing of causing a display object that is selected from among a plurality of candidates for the display object corresponding to a target object on the basis of line-of-sight information to be displayed"), as processing according to the information processing method according to the present embodiment.

The information processing apparatus according to the present embodiment causes a selected display object to be superimposed and displayed on a real space or an image showing a real space. Here, examples of the image showing a real space include a captured image in which a real space is imaged and an image in which a real space generated by computer graphics (CG) technology is shown virtually.

The information processing apparatus according to the present embodiment causes a display object to be displayed using, for example, an arbitrary technology that can cause the display object to be superimposed and displayed on a real space, such as AR technology, or an arbitrary technology that can cause the display object to be superimposed and displayed on an image showing a real space, such as image processing technology.

Specifically, the information processing apparatus according to the present embodiment performs, as display control processing, processing according to a first example shown in (2-1) below and processing according to a second example shown in (2-2) below, for example.

(2-1) First Example of Display Control Processing: Processing for Change of Manner of Display of Display Object The information processing apparatus according to the present embodiment changes the manner of display of the display object on the basis of, for example, line-of-sight information.

Here, examples of the manner of display of the display object that the information processing apparatus according to the present embodiment changes include the examples shown in (A) to (D) below.

(A) First Example of Change of Manner of Display of Display Object

The information processing apparatus according to the present embodiment changes the manner of display of the display object by changing the layout of the display object.

For example, as shown with reference to FIG. 2A and FIG. 2B, the information processing apparatus according to the present embodiment changes the layout of the display object by placing and arranging the display object on the basis of the line of sight of the user shown by line-of-sight information, in view of visual field characteristics.

(B) Second Example of Change of Manner of Display of Display Object

The information processing apparatus according to the present embodiment changes the manner of display of the display object by changing the manner of ornamentation on the display object.

Examples of the manner of ornamentation on the display object that the information processing apparatus according to the present embodiment changes include the examples shown below. Note that it goes without saying that the example of ornamentation on the display object is not limited to the examples shown below.

Make a character (an example of the display object) bold.
Mark an image (an example of the display object) with a colored edge.
Blink a character or an image.

The information processing apparatus according to the present embodiment performs highlighting of changing the manner of ornamentation on the display object in the following manner, for example.

In a case where a character (an example of the display object) is caused to be displayed in a range of the effective visual field that is neither the discrimination visual field nor the word identification limit, the information processing apparatus according to the present embodiment makes the character bold. Further, in a case where a character is caused to be displayed in the range of the discrimination visual field or the word identification limit, the information processing apparatus according to the present embodiment does not make the character bold.

In a case where an image (an example of the display object) is caused to be displayed in the other ranges, the information processing apparatus according to the present embodiment marks the image with a colored edge or blinks the image. Further, in a case where an image is caused to be displayed in the discrimination visual field, the word identification limit, or the effective visual field, the information processing apparatus according to the present embodiment neither marks the image with a colored edge nor blinks the image (that is, causes the image itself that is the display object to be displayed).

(C) Third Example of Change of Manner of Display of Display Object

The information processing apparatus according to the present embodiment changes the manner of display of the display object by changing the manner of omission of the display object.

In a case where, for example, not all the characters (an example of the display object) can be displayed within the word identification limit, the information processing apparatus according to the present embodiment performs the omission of the characters in an arbitrary omission format such as omission with a three dot leader (" . . . "). Further, in a case where, for example, all the characters can be displayed within the word identification limit, the information processing apparatus according to the present embodiment does not perform the omission of the characters. That is, it may be assumed that, in a case where the attribute information of the selected display object includes text information, the information processing apparatus according to the present embodiment changes the number of displayed characters of the text information on the basis of line-of-sight information.

(D) Fourth Example of Change of Manner of Display of Display Object

The information processing apparatus according to the present embodiment may change the manner of display of the display object by, for example, combining two or more changes of the manner of display among the change of the manner of display according to the first example shown in (A) above to the change of the manner of display according to the third example shown in (C) above.

For example, as shown in the change of the manner of display according to the first example shown in (A) above to the change of the manner of display according to the fourth example shown in (D) above, the information processing apparatus according to the present embodiment changes the manner of display of the display object on the basis of the line of sight of the user shown by line-of-sight information, in view of visual field characteristics.

Note that the processing for the change of the manner of display of the display object is not limited to the examples shown above. For example, the information processing apparatus according to the present embodiment may perform processing like that shown in (i) to (iv) below.

(i)

The information processing apparatus according to the present embodiment changes the manner of display of the display object further on the basis of state information, for example.

Here, the state information according to the present embodiment is data showing the state of the user. Examples of the state information according to the present embodiment include data showing the result of recognition of the user's behavior, data showing the state of the user's conversation, etc.

The data showing the result of recognition of the user's behavior show, for example, the result of recognition of the user's behavior such as stillness, walking, traveling, stair ascent and descent, and vehicle driving. The user's behavior is inferred on the basis of, for example, the detection result of a sensor that can detect movement and that is included in an apparatus for the display screen according to the present embodiment, such as an acceleration sensor or a gyro sensor. Note that the user's behavior may be inferred by an arbitrary technology that can recognize the user's behavior. Processing for the inference of the user's behavior may be performed by the information processing apparatus according to the present embodiment, or may be performed in an external apparatus of the information processing apparatus according to the present embodiment.

The information processing apparatus according to the present embodiment refers to a table (or a database) in which behaviors and manners of display are linked together, and causes the display object to be displayed in the manner of display corresponding to the recognized behavior, for example. Examples of the method for changing the manner of display in correspondence with the recognized behavior include a method that changes one or two or more of the size, the degree of omission, and the movement by animation, blinking, etc. of the display object in accordance with the degree of movement of the recognized behavior. As a specific example, in a case where, for example, the target object exists in the effective visual field of the user and the user is in a locomotion state, the information processing apparatus according to the present embodiment employs a layout of only an icon (an example of the display object).

Further, examples of the data showing the state of the user's conversation include data showing whether the user has a conversation or not. The data showing the state of the user's conversation are inferred by, for example, a conversation being detected on the basis of the detection result of a voice detection device such as a microphone included in an apparatus for the display screen according to the present embodiment. Processing for the inference of the state of the user's conversation may be performed by the information processing apparatus according to the present embodiment, or may be performed in an external apparatus of the information processing apparatus according to the present embodiment.

The information processing apparatus according to the present embodiment causes the display object to be displayed in the manner of display corresponding to the state of conversation shown by data showing the state of the user's conversation, for example. Examples of the method for changing the manner of display in correspondence with the state of conversation include a method that changes one or two or more of the size, the degree of omission, and the movement by animation, blinking, etc. of the display object in a case where the user has a conversation.

Note that it goes without saying that the example of changing the manner of display of the display object on the basis of state information is not limited to the examples shown above.

(ii)

The information processing apparatus according to the present embodiment changes the manner of display of the display object further on the basis of environment information, for example.

Here, the environment information according to the present embodiment is data showing the surrounding environment of the user. Examples of the data showing the surrounding environment according to the present embodiment include data showing illuminance, data showing luminance, and the like.

Examples of the data showing illuminance include data showing the detection result of an illuminance sensor included in an apparatus for the display screen according to the present embodiment.

In a case where, for example, the target object exists in the effective visual field of the user and the illuminance is larger than a prescribed threshold, the information processing apparatus according to the present embodiment makes it easier to view the display object by making a character (an example of the display object) bold or the like. Note that it goes without saying that the method for changing the manner of display in a case where data showing illuminance are used is not limited to the example shown above.

Further, examples of the data showing luminance include data showing the detection result of a luminance sensor included in an apparatus for the display screen according to the present embodiment. In a case where the apparatus for the display screen according to the present embodiment is an eyewear device or an HMD, the luminance sensor is placed so as to detect the luminance on the side the user faces.

In a case where, for example, the target object exists in the effective visual field of the user and the luminance is larger than a prescribed threshold, the information processing apparatus according to the present embodiment makes it easier to view the display object by making a character (an example of the display object) bold or the like. Note that it goes without saying that the method for changing the manner of display in a case where data showing luminance are used is not limited to the example shown above.

Note that it goes without saying that the example of changing the manner of display of the display object on the basis of environment information is not limited to the examples shown above.

(iii)

The information processing apparatus according to the present embodiment changes the manner of display of the display object further on the basis of a display object selected from among a plurality of candidates for the display object, for example. The information processing apparatus according to the present embodiment changes the manner of display of the display object on the basis of attribute information showing the attribute of the selected display object, for example.

Examples of the attribute information according to the present embodiment include data including one or two or more of the type, the degree of importance, and the degree of priority of the display object.

In a case where, for example, the target object exists outside the effective visual field of the user and the degree of importance of the display object shown by attribute information is larger than a prescribed threshold, the information processing apparatus according to the present embodiment accentuates the display object more by blinking the display object, marking the display object with a colored edge, or the like. Note that it goes without saying that the method for changing the manner of display in a case where attribute information is used is not limited to the examples shown above.

Note that it goes without saying that the example of changing the manner of display of the display object on the basis of the display object is not limited to the examples shown above.

(iv)

The information processing apparatus according to the present embodiment may change the manner of display of the display object by, for example, performing processing in which two or more pieces of processing of the processing shown in (i) above to the processing shown in (iii) above are combined.

(2-2) Second Example of Display Control Processing: Processing for Selection of Display Object The information processing apparatus according to the present embodiment selects a display object from among a plurality of candidates for the display object corresponding to a target object.

The information processing apparatus according to the present embodiment selects a display object corresponding to a target object on the basis of, for example, the position of the viewed point on the display screen identified on the basis of line-of-sight information, the position of the target object on the display screen, and information showing visual field characteristics. Alternatively, it may be assumed that the information processing apparatus according to the present embodiment selects a display object corresponding to a specific position from among a plurality of candidate objects on the basis of the relationship between the position of the viewed point identified on the basis of line-of-sight information and the specific position (corresponding to the target object). Examples of the information showing visual field characteristics according to the present embodiment include data showing the visual field characteristics of a person shown with reference to FIG. 1.

More specifically, the information processing apparatus according to the present embodiment calculates the distance between the position of the viewed point mentioned above and the position of the target object mentioned above. Then, the information processing apparatus according to the present embodiment selects a display object corresponding to the target object on the basis of the calculated distance and information showing visual field characteristics.

From the calculated distance, the information processing apparatus according to the present embodiment assesses what range of visual field characteristics the position of the target object mentioned above falls within. Then, the information processing apparatus according to the present embodiment selects a display object corresponding to the assessed range from among a plurality of candidates for the display object corresponding to the target object.

For example, in a case where the assessed range is within the effective visual field, that is, in a case where the target object exists in the effective visual field of the user, the information processing apparatus according to the present embodiment selects a display object including a character. Further, for example, in a case where the assessed range is outside the effective visual field, that is, in a case where the target object exists outside the effective visual field of the user, the information processing apparatus according to the present embodiment selects a display object in which a character is excluded.

Further, in a case where the degree of priority has been set for each of a plurality of candidates for the display object, the information processing apparatus according to the present embodiment may preferentially select a candidate for the display object with a high degree of priority. The information processing apparatus according to the present embodiment may grasp the degree of priority by referring to attribute information, for example.

The information processing apparatus according to the present embodiment causes a display object that is selected from among a plurality of candidates for the display object corresponding to the target object to be displayed on the display screen by performing the processing according to the first example shown in (2-1) above and the processing according to the second example shown in (2-2) above, for example. Further, the manner of display of the display object dynamically changes on the basis of line-of-sight information, etc.

Note that the display control processing according to the present embodiment is not limited to the processing according to the first example shown in (2-1) above or the processing according to the second example shown in (2-2) above.

For example, the information processing apparatus according to the present embodiment may further perform processing for suppressing dynamic change of display on the basis of line-of-sight information, etc.

The information processing apparatus according to the present embodiment performs display control processing according to the present embodiment at set time intervals, for example.

Examples of the time interval according to the present embodiment include every set seconds, intervals corresponding to a set number of frames, etc. The time interval according to the present embodiment may be a fixed time interval set in advance, or may be a variable time interval that can be varied on the basis of the user's operation, etc. For example, the information processing apparatus according to the present embodiment may perform display control processing according to the present embodiment at an interval of 1 second or more. Alternatively, the information processing apparatus according to the present embodiment may perform display control processing according to the present embodiment every 2 frames or more with respect to a display frame rate of 60 fps, for example. That is, the information processing apparatus according to the present embodiment may perform display control processing according to the present embodiment at a time interval longer than a time interval in which 1 frame is displayed.

By display control processing according to the present embodiment being performed at set time intervals, the frequency with which the display of the display object on the display screen dynamically changes is made smaller than in a case where display control processing according to the present embodiment is performed for each frame. Hence, by display control processing according to the present embodiment being performed at set time intervals, the switching of display of the display object on the display screen is suppressed, and therefore the burden on the user can be reduced. Note that, in terms of reducing the burden on the user, display control processing according to the present embodiment may be performed at an interval of 1 second or more as shown above as an example.

Further, for example, the information processing apparatus according to the present embodiment may perform processing of maintaining the layout of the already displayed display object in a period in which display control processing according to the present embodiment is not performed.

The information processing apparatus according to the present embodiment calculates the distance between the position of the viewed point on the display screen identified on the basis of line-of-sight information and the position of the target object on the display screen. Then, the information processing apparatus according to the present embodiment maintains the layout of the already displayed display object by magnifying or minifying the display object on the basis of the calculated distance.

By the layout of the already displayed display object being maintained, the sense of incongruity that the user seeing the already displayed display object can feel can be reduced in a period in which display control processing according to the present embodiment is not performed.

The information processing apparatus according to the present embodiment performs display control processing like that described above as processing according to the information processing method according to the present embodiment, for example.

Note that the display control processing described above is processing in which processing according to the information processing method according to the present embodiment is prescribed, for the sake of convenience. Hence, the processing according to the information processing method according to the present embodiment can grasp the display control processing described above as two or more pieces of processing (on the basis of an arbitrary manner of cutting and division), for example.

[3] Examples of Processing According to Information Processing Method According to Present Embodiment Next, specific examples of processing according to the information processing method according to the present embodiment are shown.

FIG. 3 is a flow chart showing an example of processing according to the information processing method according to the present embodiment.

The information processing apparatus according to the present embodiment searches for a target object and detects the target object (S100). The information processing apparatus according to the present embodiment detects the target object by "performing, on a captured image, processing according to an arbitrary recognition technology such as face recognition technology or object recognition technology" or "using position information and a database in which positions and target objects are linked together," or a combination of these, for example.

Note that the processing of step S100 may be performed in, for example, an external apparatus of the information processing apparatus according to the present embodiment, such as a server that can communicate with the information processing apparatus according to the present embodiment. In a case where the processing of step S100 is performed in an external apparatus, the information processing apparatus according to the present embodiment performs the processing of step S102 and the subsequent steps described later using the result of detection of the target object acquired from the external apparatus.

The information processing apparatus according to the present embodiment assesses whether the target object is detected or not (S102).

In a case where in step S102 it is not assessed that the target object is detected, the information processing apparatus according to the present embodiment ends the processing shown in FIG. 3. Further, in a case where in step S102 it is assessed that the target object is detected, the information processing apparatus according to the present embodiment performs the processing of step S104 and the subsequent steps described later.

In a case where in step S102 it is assessed that the target object is detected, the information processing apparatus according to the present embodiment calculates the position of the viewed point (gaze point) on the display screen on the basis of line-of-sight information (S104). The information processing apparatus according to the present embodiment takes, as the position of the viewed point on the display screen, the intersection point of a straight line in the line-of-sight direction identified from line-of-sight information and the display screen, for example. Note that the method for calculating the position of the viewed point on the display screen is not limited to the above, and the information processing apparatus according to the present embodiment may use an arbitrary method that can identify the position of the viewed point on the display screen.

The information processing apparatus according to the present embodiment reads out data of display objects linked with the detected target object from a recording medium such as a storage unit (described later) (S106).

The information processing apparatus according to the present embodiment calculates the position of the detected target object on the display screen (S108). In a case where in step S100 a plurality of target objects are detected, the information processing apparatus according to the present embodiment calculates the position for each detected target object.

The information processing apparatus according to the present embodiment takes, as the position of the target object on the display screen, the coordinates on the display screen of the target object when a captured image in which the target object is included is displayed on the display screen, for example. Note that the method for calculating the position of the target object on the display screen is not limited to the above, and the information processing apparatus according to the present embodiment may use an arbitrary method that can identify the position of the target object on the display screen.

The information processing apparatus according to the present embodiment calculates the distance between the position of the viewed point on the display screen calculated in step S104 and the position of the target object on the display screen calculated in step S108 (S110). In a case where in step S100 a plurality of target objects are detected, the information processing apparatus according to the present embodiment calculates the distance for each detected target object.

The information processing apparatus according to the present embodiment selects a display object to be caused to be displayed on the display screen on the basis of the distance calculated in step S110 and the information of visual field characteristics (S112). In a case where in step S100 a plurality of target objects are detected, the information processing apparatus according to the present embodiment selects a display object for each target object, for example. Then, the information processing apparatus according to the present embodiment calculates the layout of the selected display object, and causes the display object to be displayed on the display screen (S114). Note that examples of the processing of step S112 and the processing of step S114 are described later.

The information processing apparatus according to the present embodiment causes a display object that is selected from among a plurality of candidates for the display object corresponding to the target object to be displayed on the display screen by performing the processing shown in FIG. 3, for example. Further, for example by the processing shown in FIG. 3 being performed, the manner of display of the display object dynamically changes on the basis of line-of-sight information, etc.

Note that the processing according to the information processing method according to the present embodiment is not limited to the example shown in FIG. 3.

For example, in a case where an application executes depiction other than display control processing according to the present embodiment, the display control processing shown in FIG. 3 may be stopped, as exceptional processing. Here, data for assessing whether to stop the display control processing in the above case or not (for example, a flag showing ON or OFF of an interrupt, etc.) are included in metadata of the application, for example.

Figure 4A:
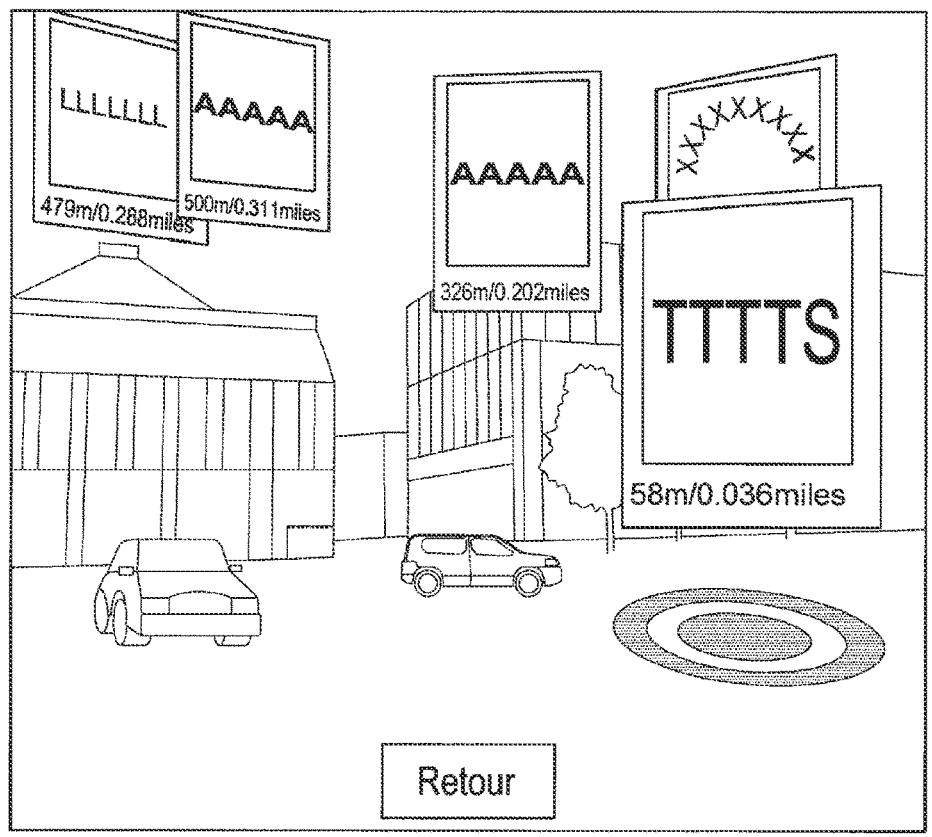
FIG. 4A is an explanatory diagram showing a display example of display objects displayed by processing according to the information processing method according to the present embodiment.
Figure 4B:
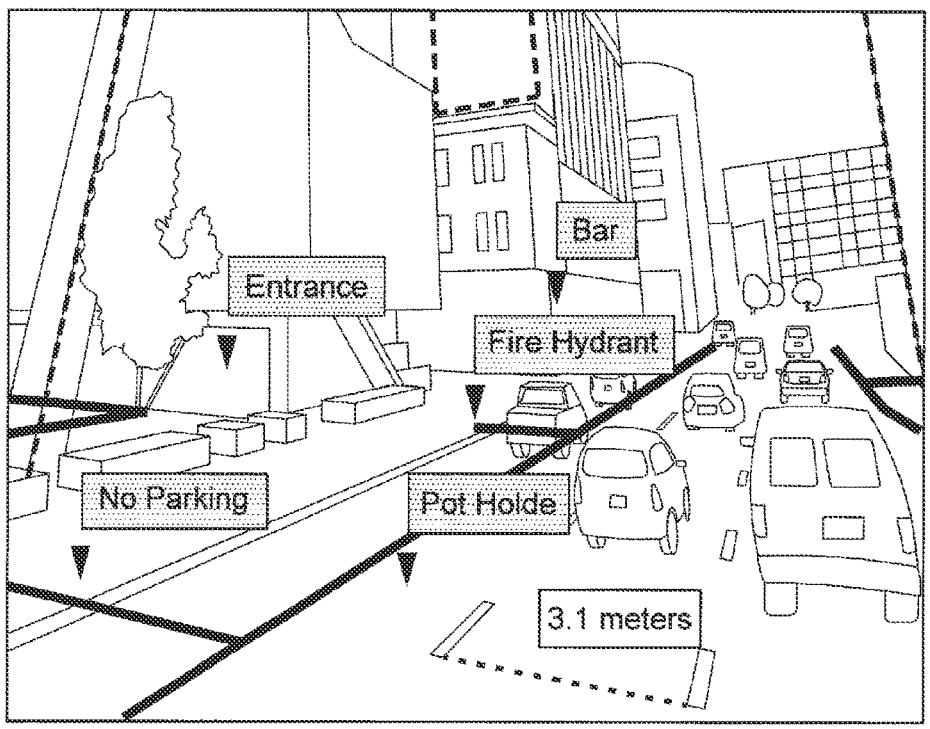
FIG. 4B is an explanatory diagram showing a display example of display objects displayed by processing according to the information processing method according to the present embodiment.
Figure 4C:
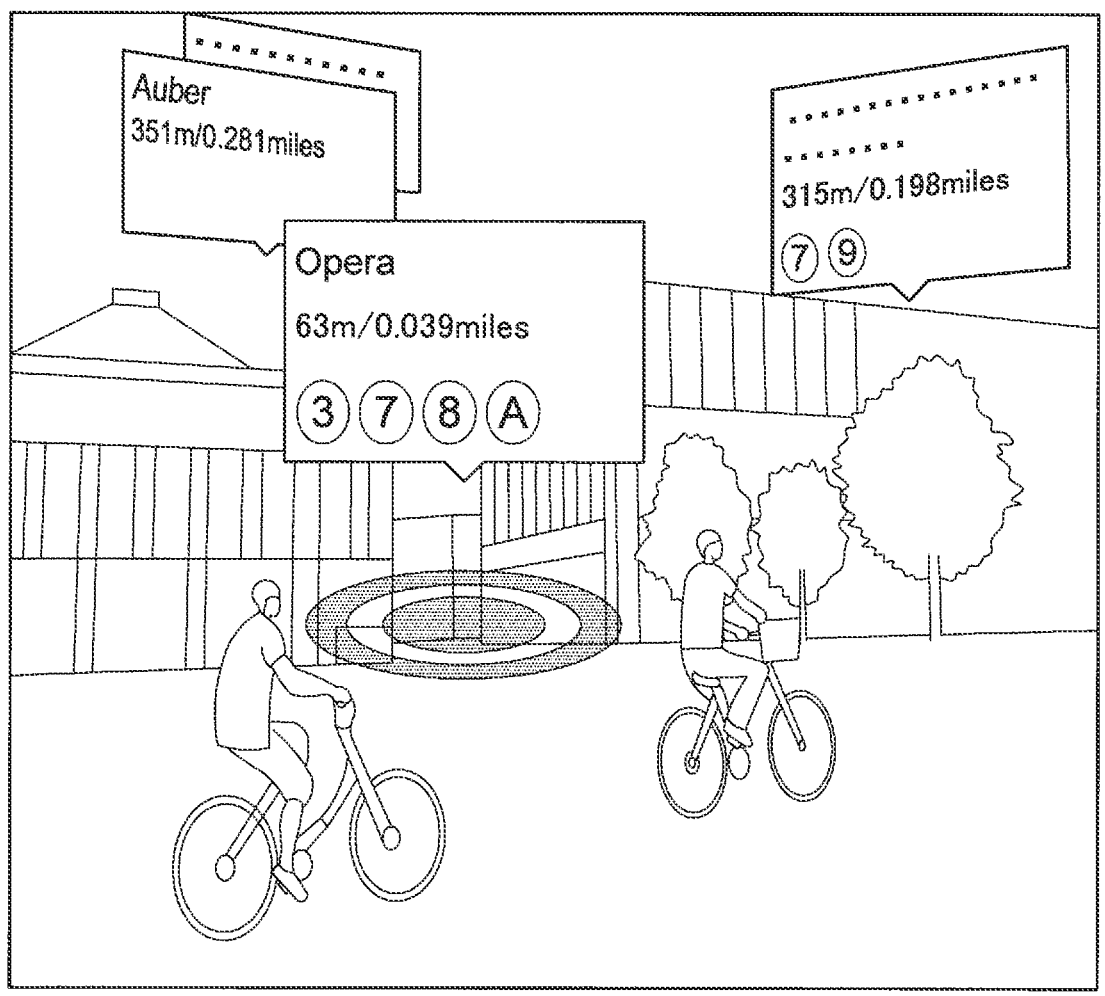
FIG. 4C is an explanatory diagram showing a display example of display objects displayed by processing according to the information processing method according to the present embodiment.

Each of FIGS. 4A, 4B, and 4C are explanatory diagrams showing a display example of display objects that are displayed by processing according to the information processing method according to the present embodiment. FIG. 4A shows an example of display of display objects in which icons and characters are combined. Further, FIG. 4B shows an example of display of display objects showing characters. Further, FIG. 4C shows an example of display of display objects in which titles, characters, and icons are combined.

The substance shown by the display object corresponding to the target object may be, for example, one or both of a substance regarding a person (for example, a name, a nickname, a hometown, a photograph, etc., or a combination of these) and a substance regarding an object (for example, "the nutritive value of a food," "the author and cover of a book," "the name, place, and telephone number of a store," etc.). Note that the substance shown by the display object corresponding to the target object is not limited to the examples shown above, and may be an arbitrary substance.

Note that, although FIGS. 4A, 4B, and 4C show display objects corresponding to a plurality of target objects for the sake of convenience, there may be, among the display objects shown in FIGS. 4A, 4B, and 4C, a display object that is not displayed on the basis of line-of-sight information.

FIG. 5 is a flow chart showing an example of processing according to the information processing method according to the present embodiment, and shows examples of the processing of step S112 and the processing of step S114 of FIG. 3. Further, FIG. 6 is an explanatory diagram for describing an example of processing according to the information processing method according to the present embodiment, and shows an example of attribute information according to the present embodiment.

The information processing apparatus according to the present embodiment determines, on the display screen, a display range (displayable region) in which a selected display object can be caused to be displayed (S200). Note that the information processing apparatus according to the present embodiment further determines, in step S200, a display position in the display range in which the display object is caused to be displayed. For example, the display position of the display object is determined so as to be in the vicinity of the target object, as shown in FIGS. 2A and 2B. Note that, in a case where a plurality of character strings are displayed as the display object, the character strings may be arranged in the vertical direction of the display range in the order of the degree of priority of the character string. Further, in a case where the display object is a character string, the character string may be placed preferentially in the discrimination visual field or the word identification limit.

The information processing apparatus according to the present embodiment determines, on the display screen, a display range in which a display object can be caused to be displayed, on the basis of, for example, the position of the viewed point on the display screen identified on the basis of line-of-sight information and information showing visual field characteristics. The information processing apparatus according to the present embodiment determines the display range on the basis of, for example, the effective visual field identified by the position of the viewed point and information showing visual field characteristics. Note that it may be assumed that the display range is larger than the effective visual field and encompasses the effective visual field. Further, it may be assumed that the display range is a range smaller than the display screen S.

The information processing apparatus according to the present embodiment refers to the attribute information shown in FIG. 6, and performs the processing of steps S202 to S206 described later, in order starting from the candidate for the display object corresponding to the field with the highest degree of priority. Further, in a case where a candidate for the display object does not exist, the information processing apparatus according to the present embodiment ends the processing shown in FIG. 5.

The information processing apparatus according to the present embodiment assesses whether the value of the field is a character string and the display position determined in step S200 is outside the range of the effective visual field or not (S202).

In a case where in step S202 it is assessed that the value of the field is a character string and the display position determined in step S200 is outside the range of the effective visual field, the information processing apparatus according to the present embodiment performs the processing from step S202 on a display object corresponding to another field. That is, it may be assumed that, in a case where the assessment result of step S202 is affirmative assessment (YES), it is practically prohibited to select, as the display object, a candidate object that includes a character string existing outside the range of the effective visual field.

Further, in a case where in step S202 it is not assessed that the value of the field is a character string and the display position determined in step S200 is outside the range of the effective visual field, the information processing apparatus according to the present embodiment places the display object in the determined display range (S204). That is, in a case where it is assessed that the value of the field is not a character string or in a case where it is assessed that the determined display position is within the range of the effective visual field, the display object is placed in the determined display range. Note that, in a case where a character string is placed as the display object in a range of the effective visual field that is neither the discrimination visual field nor the word identification limit as described in the second example described above, the information processing apparatus according to the present embodiment may make the characters bold. Further, in a case where a character string is placed in the range of the discrimination visual field or the word identification limit, the information processing apparatus according to the present embodiment may not make the characters bold. Then, the information processing apparatus according to the present embodiment assesses whether, due to the placement of the display object, the placed display object protrudes out of the display range determined in step S200 or not (S206).

In a case where in step S206 it is not assessed that the placed display object protrudes out of the determined display range, the information processing apparatus according to the present embodiment performs the processing from step S202 on a display object corresponding to another field.

Further, in a case where in step S206 it is assessed that the placed display object protrudes out of the determined display range, the information processing apparatus according to the present embodiment ends the processing shown in FIG. 5. That is, the assessment of step S206 is repeated until it becomes practically difficult or impossible to place another display object in the determined display range. Note that, in a case where, due to the placement of a display object, a part of the display object protrudes out of the effective visual field, the protruding part of the display object may be displayed.

By the processing of FIG. 5, the placement of a character string outside the range of the effective visual field is practically prohibited, and a character string is placed only in the range of the effective visual field. As a result, a character string is placed only in the range of the effective visual field; hence, the burden of recognition by the user is reduced, and the time of recognition of information by the user is shortened. Note that, as a side effect, the amount of information in the display range is reduced, and consequently also the processing burden as a system can be reduced.

The information processing apparatus according to the present embodiment performs, for example, the processing shown in FIG. 5 as the processing of step S112 and the processing of step S114 of FIG. 3. The display object is displayed in the determined display range by the processing shown in FIG. 5 being performed, for example.

Note that the processing of step S112 and the processing of step S114 of FIG. 3 are not limited to the processing shown in FIG. 5. For example, in a range that is neither the discrimination visual field nor the word identification limit, it is difficult for the user to identify a character, as described above; hence, in step S202 of FIG. 5, "the range of the discrimination visual field or the word identification limit" may be seen instead of "the range of the effective visual field."

Further, the information processing apparatus according to the present embodiment may arrange the display object using a flow layout of Hyper Text Markup Language (HTML), for example.

Further, as described above, the information processing apparatus according to the present embodiment may change the manner of display of the display object further on the basis of one or two or more of state information, environment information, and the selected display object, for example.

(Information Processing Apparatus According to Present Embodiment)

Next, an example of the configuration of the information processing apparatus according to the present embodiment that can perform the processing according to the information processing method according to the present embodiment described above is described.

Figure 7:
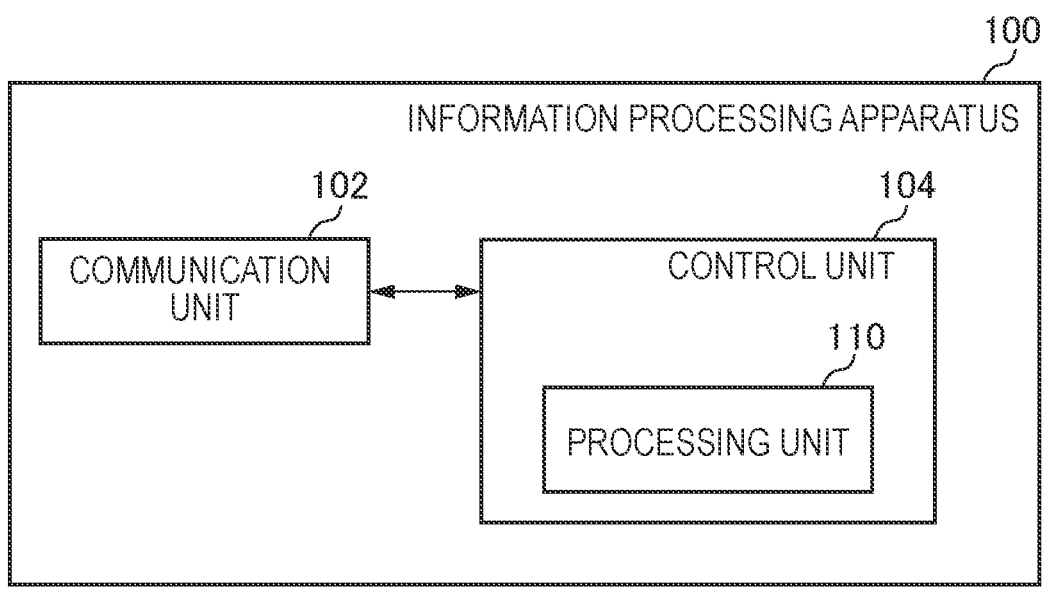
FIG. 7 is a block diagram showing an example of a configuration of an information processing apparatus according to the present embodiment.

FIG. 7 is a block diagram showing an example of the configuration of an information processing apparatus 100 according to the present embodiment. The information processing apparatus 100 includes, for example, a communication unit 102 and a control unit 104.

Further, the information processing apparatus 100 may include, for example, a read-only memory (ROM, not illustrated), a random access memory (RAM, not illustrated), a storage unit (not illustrated), an operation unit that the user can operate (not illustrated), a display unit in which various screens are displayed on a display screen (not illustrated), etc. The information processing apparatus 100 connects the components mentioned above together by means of, for example, a bus as a data transmission path.

The ROM (not illustrated) stores data for control such as a program and an operating parameter to be used by the control unit 104. The RAM (not illustrated) temporarily stores a program to be executed by the control unit 104, etc.

The storage unit (not illustrated) is a storage means included in the information processing apparatus 100, and stores various data such as data for the information processing method according to the present embodiment such as attribute information and display objects, and various applications, for example. Here, examples of the storage unit (not illustrated) include a magnetic recording medium such as a hard disk, a nonvolatile memory such as a flash memory, etc. Further, the storage unit (not illustrated) may be attachable to and detachable from the information processing apparatus 100.

As the operation unit (not illustrated), an operation input device described later is given. Further, as the display unit (not illustrated), a display device described later is given.

[Example of Hardware Configuration of Information Processing Apparatus 100]

Figure 8:
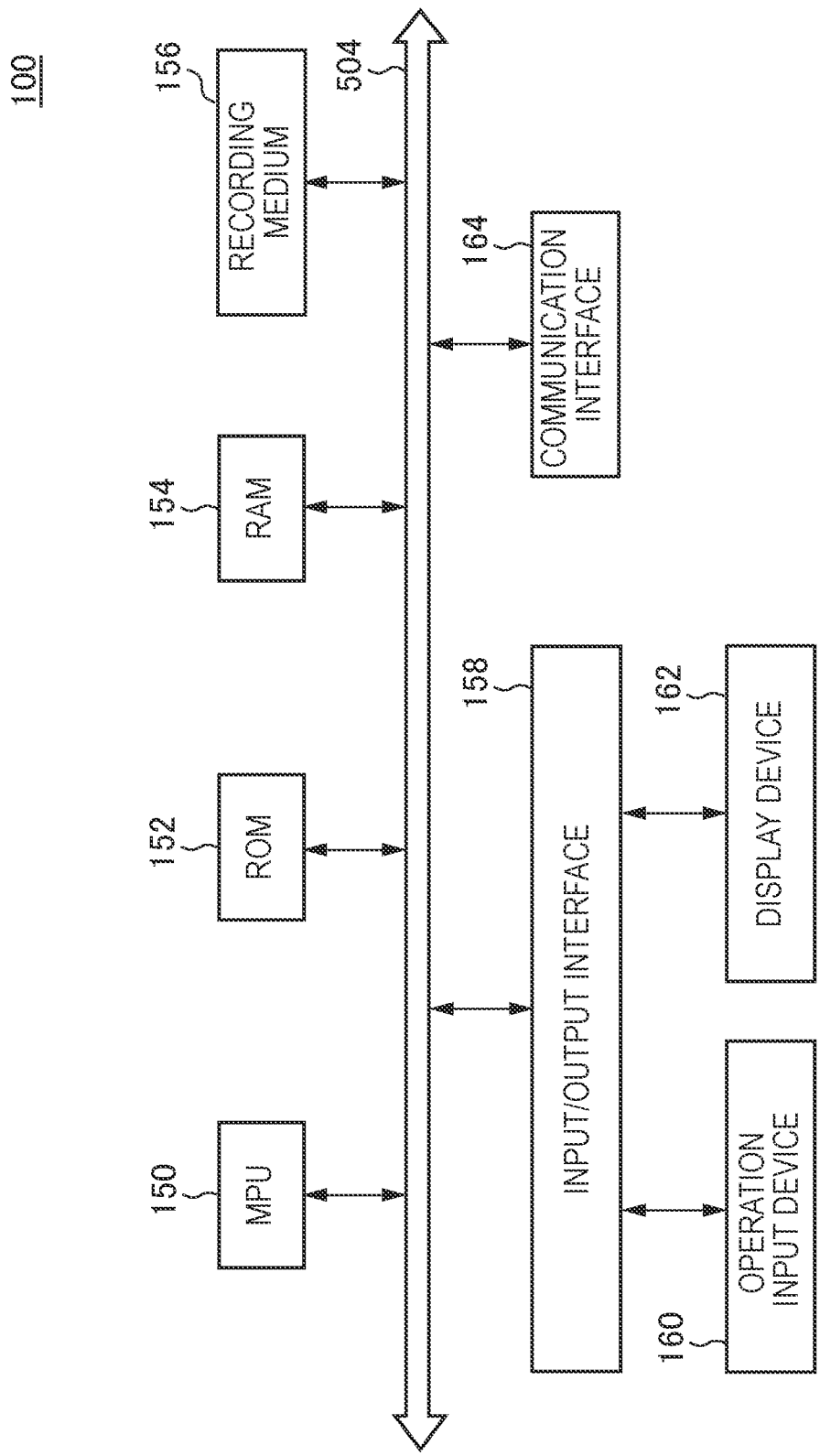
FIG. 8 is an explanatory diagram showing an example of a hardware configuration of the information processing apparatus according to the present embodiment.

FIG. 8 is an explanatory diagram showing an example of the hardware configuration of the information processing apparatus 100 according to the present embodiment. The information processing apparatus 100 includes, for example, an MPU 150, a ROM 152, a RAM 154, a recording medium 156, an input/output interface 158, an operation input device 160, a display device 162, and a communication interface 164. Further, the information processing apparatus 100 connects the components together by means of, for example, a bus 166 as a data transmission path.

The MPU 150 includes, for example, one or two or more processors, various processing circuits, etc. that include an arithmetic circuit such as an MPU, and functions as the control unit 104 that controls the entire information processing apparatus 100. Further, the MPU 150 plays the role of a processing unit 110 described later in the information processing apparatus 100, for example. Note that the processing unit 110 may include a dedicated (or general-purpose) circuit that can perform the processing of the processing unit 110 (for example, a processor provided separately from the MPU 150, etc.).

The ROM 152 stores data for control such as a program and an operating parameter to be used by the MPU 150, etc. The RAM 154 temporarily stores, for example, a program to be executed by the MPU 150, etc.

The recording medium 156 functions as a storage unit (not illustrated), for example, and stores various data such as data for the information processing method according to the present embodiment such as attribute information, and various applications. Here, examples of the recording medium 156 include a magnetic recording medium such as a hard disk and a nonvolatile memory such as a flash memory. Further, the recording medium 156 may be attachable to and detachable from the information processing apparatus 100.

The input/output interface 158 connects the operation input device 160 and the display device 162, for example. The operation input device 160 functions as an operation unit (not illustrated), and further the display device 162 functions as a display unit (not illustrated). Here, examples of the input/output interface 158 include a Universal Serial Bus (USB) terminal, a Digital Visual Interface (DVI) terminal, a High-Definition Multimedia Interface (HDMI) (registered trademark) terminal, various processing circuits, etc.

Further, the operation input device 160 is provided on the information processing apparatus 100, and is connected to the input/output interface 158 in the interior of the information processing apparatus 100, for example. Examples of the operation input device 160 include a button, a direction key, and a rotary selector such as a jog dial, a combination of these, etc.

Further, the display device 162 is provided on the information processing apparatus 100, and is connected to the input/output interface 158 in the interior of the information processing apparatus 100, for example. Examples of the display device 162 include a liquid crystal display, an organic electro-luminescence display (an organic EL display; also called an organic light emitting diode display (OLED display)), etc.

Note that it goes without saying that the input/output interface 158 may be connected to an external device such as an external operation input device (for example, a keyboard, a mouse, etc.) or an external display device of the information processing apparatus 100. Further, the display device 162 may be a device in which display and the user's operation are possible, such as a touch panel, for example.

The communication interface 164 is a communication means included in the information processing apparatus 100, and functions as the communication unit 102 for performing communication with an external device such as an imaging device or an external apparatus such as a server wirelessly or wiredly via a network (or directly), for example. Here, examples of the communication interface 164 include a communication antenna and a radio frequency (RF) circuit (wireless communication), an IEEE 802.15.1 port and a transmission/reception circuit (wireless communication), an IEEE 802.11 port and a transmission/reception circuit (wireless communication), a local area network (LAN) terminal and a transmission/reception circuit (wired communication), etc.

The information processing apparatus 100 performs processing according to the information processing method according to the present embodiment by means of the configuration shown in FIG. 8, for example. Note that the hardware configuration of the information processing apparatus 100 according to the present embodiment is not limited to the configuration shown in FIG. 8.

For example, the information processing apparatus 100 may not include the communication interface 164 in a case of performing communication with an external apparatus etc. via a connected external communication device or in a case of being a configuration in which processing is performed in a stand-alone manner. Further, the communication interface 164 may be a configuration in which communication can be performed with one or two or more external apparatuses etc. by means of a plurality of communication systems.

Further, the information processing apparatus 100 may have a configuration not including the recording medium 156, the operation input device 160, or the display device 162, for example.

Further, for example, a part or the whole of the configuration shown in FIG. 8 (or a configuration according to a modification example) may be obtained using one or two or more ICs.

An example of the configuration of the information processing apparatus 100 will now be described with reference to FIG. 7 again. The communication unit 102 is a communication means included in the information processing apparatus 100, and performs communication with an external device such as an imaging device and an external apparatus such as a server wirelessly or wiredly via a network (or directly). Further, the communication of the communication unit 102 is controlled by the control unit 104, for example.

Here, examples of the communication unit 102 include a communication antenna and an RF circuit, a LAN terminal and a transmission/reception circuit, etc., but the configuration of the communication unit 102 is not limited to the above. For example, the communication unit 102 may have a configuration corresponding to an arbitrary standard that can perform communication, such as a USB terminal and a transmission/reception circuit, or an arbitrary configuration that can communicate with an external apparatus via a network. Further, the communication unit 102 may be a configuration that can perform communication with one or two or more external apparatuses etc. by means of a plurality of communication systems.

The control unit 104 includes, for example, an MPU or the like, and plays the role of controlling the entire information processing apparatus 100. Further, the control unit 104 includes, for example, the processing unit 110, and plays the role of principally performing processing according to the information processing method according to the present embodiment.

The processing unit 110 plays the role of principally performing display control processing according to the present embodiment, and causes a display object that is selected from among a plurality of candidates for the display object corresponding to a target object to be displayed on the display screen on the basis of line-of-sight information.

Further, the processing unit 110 changes the manner of display of the display object on the basis of, for example, line-of-sight information, for example as shown in (A) above to (D) above. The processing unit 110 may change the manner of display of the display object further on the basis of one or two or more of state information, environment information, and the selected display object.

More specifically, the processing unit 110 performs the processing according to the first example shown in (2-1) above and the processing according to the second example shown in (2-2) above, for example; thereby, causes a selected display object to be displayed on the display screen, and further dynamically changes the manner of display of the display object. Further, the processing unit 110 may further perform processing for suppressing dynamic change of display or the like, as described above.

Further, the processing unit 110 performs processing of detecting a target object as described with reference to FIG. 3, for example; and in a case where the target object is detected, the processing unit 110 performs display control processing according to the present embodiment.

By including, for example, the processing unit 110, the control unit 104 principally performs processing according to the information processing method according to the present embodiment (for example, display control processing according to the present embodiment).

The information processing apparatus 100 performs processing according to the information processing method according to the present embodiment (for example, display control processing according to the present embodiment) by means of the configuration shown in FIG. 7, for example.

Thus, the information processing apparatus 100 can facilitate the recognition of the display object by the user by means of the configuration shown in FIG. 7, for example.

Further, for example by means of the configuration shown in FIG. 7, the information processing apparatus 100 can exhibit an effect obtained by processing according to the information processing method according to the present embodiment like that described above being performed.

Note that the configuration of the information processing apparatus according to the present embodiment is not limited to the configuration shown in FIG. 7.

For example, the information processing apparatus according to the present embodiment may include the processing unit 110 shown in FIG. 7 separately from the control unit 104 (for example, obtain the processing unit 110 by using another processing circuit).

Further, as described above, the display control processing according to the present embodiment is processing in which processing according to the information processing method according to the present embodiment is prescribed, for the sake of convenience. Hence, the configuration for performing processing according to the information processing method according to the present embodiment is not limited to the configuration shown in FIG. 7, and may have a configuration in accordance with the manner of cutting and division of processing according to the information processing method according to the present embodiment.

Further, for example, the information processing apparatus according to the present embodiment may not include the communication unit 102 in a case where communication is performed with an external apparatus via an external communication device having a similar function and a similar configuration to the communication unit 102 or in a case where processing is performed in a stand-alone manner.

Hereinabove, a description is given using an information processing apparatus as the present embodiment; but the present embodiment is not limited to this form. The present embodiment can be used for various devices that can perform processing according to the information processing method according to the present embodiment, such as wearable devices used by being mounted on the user's head such as eyewear devices and HMDs, computers such as personal computers (PCs) and servers, communication devices such as mobile phones and smartphones, and tablet-type devices, for example. Further, the present embodiment can be used also for a processing IC that can be incorporated in a device like that mentioned above, for example.

Further, the information processing apparatus according to the present embodiment may be used for an information processing system in which connection to a network (or communication between apparatuses) is a presupposition, such as cloud computing or the like, for example. Examples of the information processing system in which processing according to the information processing method according to the present embodiment is performed include a system in which display on a display screen of another apparatus is controlled by an apparatus that performs display control processing according to the present embodiment.

(Program According to Present Embodiment)

The recognition of the display object by the user can be facilitated by a program for causing a computer system to function as the information processing apparatus according to the present embodiment (for example, a program that can execute processing according to the information processing method according to the present embodiment, such as display control processing according to the present embodiment) being executed by a processor or the like in the computer system. Here, as the computer system according to the present embodiment, a single computer or a plurality of computers are given. A series of processing according to the information processing method according to the present embodiment is performed by the computer system according to the present embodiment.

Further, an effect obtained by the processing according to the information processing method according to the present embodiment described above can be exhibited by a program for causing a computer system to function as the information processing apparatus according to the present embodiment being executed by a processor or the like in the computer system.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, although in the above it is stated that a program for causing a computer system to function as the information processing apparatus according to the present embodiment (computer program) is provided, the present embodiment can further provide also a recording medium (computer-readable medium) in which the program mentioned above is stored.

The configuration described above shows an example of the present embodiment, and is included in the technical scope of the present disclosure, as a matter of course.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus including:

a processing unit configured to select a display object from among a plurality of candidate objects corresponding to a specific position in a visual field of a user and to perform display control processing of causing the selected display object to be displayed on a display screen in association with the specific position on a basis of line-of-sight information showing a line of sight of the user.

(2)

The information processing apparatus according to (1), in which the processing unit changes a manner of display of the display object on the basis of the line-of-sight information.

(3)

The information processing apparatus according to (2), in which the processing unit changes the manner of display of the display object by changing at least one of a layout of the display object, a manner of ornamentation on the display object, and a manner of omission of the display object.

(4)

The information processing apparatus according to (2) or (3), in which the processing unit changes the manner of display of the display object further on a basis of state information showing at least one of a locomotion state and a conversation state of the user.

(5)

The information processing apparatus according to any one of (1) to (4), in which the plurality of candidate objects include attribute information, and the processing unit changes a manner of display of the display object further on a basis of the attribute information of the selected display object.

(6)

The information processing apparatus according to (5), in which the processing unit determines the manner of display of the display object on a basis of an assessment of whether the attribute information of the selected display object includes text information or whether the attribute information of the selected display object includes no text information.

(7)

The information processing apparatus according to (6), in which, in a case where the attribute information of the selected display object includes text information, the processing unit changes a number of displayed characters of the text information on the basis of the line-of-sight information.

(8)

The information processing apparatus according to (6) or (7), in which, in a case where the attribute information of the selected display object includes text information, the processing unit performs highlighting of the text information on the basis of the line-of-sight information.

(9)

The information processing apparatus according to any one of (5) to (8), in which each of the plurality of candidate objects includes, as the attribute information, information showing a degree of priority, and the processing unit preferentially selects, as the display object, a candidate object having a relatively high degree of priority from among the plurality of candidate objects.

(10)

The information processing apparatus according to any one of (1) to (9), in which the processing unit selects the display object corresponding to the specific position from among the plurality of candidate objects on a basis of a relationship between a position of a viewed point identified on the basis of the line-of-sight information and the specific position.

(11)

The information processing apparatus according to (10), in which the processing unit selects the display object corresponding to the specific position from among the plurality of candidate objects on a basis of an assessment of whether a distance between the position of the viewed point and the specific position is less than or equal to a first value or whether the distance between the position of the viewed point and the specific position is larger than the first value and less than or equal to a second value.

(12)

The information processing apparatus according to (11), in which the processing unit prohibits selection of a candidate object including text information among the plurality of candidate objects on a basis of an assessment that the distance between the position of the viewed point and the specific position is larger than the first value and less than or equal to the second value.

(13)

The information processing apparatus according to (11) or (12), in which the first value and the second value are values based on a visual field characteristic.

(14)

The information processing apparatus according to any one of (10) to (13), in which the processing unit determines a display range of the display screen in which the display object is caused to be displayed, on a basis of the relationship between the position of the viewed point and the specific position, and limits placement of the display object that is to be caused to be displayed on the display screen, on a basis of a visual field characteristic and the determined display range.

(15)

The information processing apparatus according to any one of (1) to (14), in which the processing unit performs processing of detecting a target object corresponding to the specific position, and performs the display control processing in accordance with detection of the target object.

(16)

The information processing apparatus according to any one of (1) to (15), in which the processing unit performs the display control processing at a time interval longer than a time interval in which 1 frame is displayed, and performs layout processing of maintaining a layout of the already displayed display object in a period in which the display control processing is not performed.

(17)

The information processing apparatus according to (16), in which the processing unit performs the layout processing on a basis of a distance between a position of a viewed point identified on the basis of the line-of-sight information and the specific position.

(18)

The information processing apparatus according to any one of (1) to (17), in which the processing unit causes the selected display object to be superimposed and displayed on a real space or an image showing a real space.

(19)

An information processing method including:

executing, by an information processing apparatus, display control processing of selecting a display object from among a plurality of candidate objects corresponding to a specific position in a visual field of a user on a basis of line-of-sight information showing a line of sight of the user, and causing the selected display object to be displayed on a display screen in association with the specific position.

(20)

A computer-readable medium including:

an instruction operable on an information processing apparatus so as to execute an information processing method, in which the information processing method includes executing, by the information processing apparatus, display control processing of selecting a display object from among a plurality of candidate objects corresponding to a specific position in a visual field of a user on a basis of line-of-sight information showing a line of sight of the user, and causing the selected display object to be displayed on a display screen in association with the specific position.

(II-1)

An information processing apparatus including a processing unit configured to perform processing of causing a display object that is selected from among a plurality of candidates for the display object corresponding to a target object on a basis of line-of-sight information showing a line of sight of a user to be displayed, in which the processing unit changes a manner of display of the display object on a basis of the line-of-sight information.

(II-2)

The information processing apparatus according to (II-1), in which the processing unit changes the manner of display of the display object by changing a layout of the display object.

(II-3)

The information processing apparatus according to (II-1) or (II-2), in which the processing unit changes the manner of display of the display object by changing a manner of ornamentation on the display object.

(II-4)

The information processing apparatus according to any one of (II-1) to (II-3), in which the processing unit changes the manner of display of the display object by changing a manner of omission of the display object.

(II-5)

The information processing apparatus according to any one of (II-1) to (II-4), in which the processing unit changes the manner of display of the display object further on a basis of state information showing a state of the user.

(II-6)

The information processing apparatus according to any one of (II-1) to (II-5), in which the processing unit changes the manner of display of the display object further on a basis of environment information showing a surrounding environment of the user.

(II-7)

The information processing apparatus according to any one of (II-1) to (II-6), in which the processing unit changes the manner of display of the display object further on a basis of the selected display object.

(II-8)

The information processing apparatus according to any one of (II-1) to (II-7), in which the processing unit selects the display object corresponding to the target object on a basis of a position of a viewed point on a display screen identified on a basis of the line-of-sight information, a position of the target object on the display screen, and information showing visual field characteristics.

(II-9)

The information processing apparatus according to (II-8), in which the processing unit calculates a distance between the position of the viewed point and the position of the target object, and selects the display object corresponding to the target object on a basis of the calculated distance and the information showing visual field characteristics.

(II-10)

The information processing apparatus according to (8) or (II-9), in which a degree of priority is set for each of the plurality of candidates for the display object, and the processing unit preferentially selects a candidate for the display object with a high degree of priority.

(II-11)

The information processing apparatus according to any one of (II-8) to (II-10), in which the processing unit determines, on the display screen, a display range in which the display object is caused to be displayed, on a basis of the position of the viewed point and the information showing visual field characteristics, and causes the display object to be displayed in the determined display range.

(II-12)

The information processing apparatus according to any one of (II-1) to (II-11), in which the processing unit performs processing of detecting the target object, and performs the processing of causing the display object to be displayed in a case where the target object is detected.

(II-13)

The information processing apparatus according to any one of (II-1) to (II-12), in which the processing unit performs the processing of causing the display object to be displayed at a set time interval.

(II-14)

The information processing apparatus according to (II-13), in which, in a period in which the processing of causing the display object to be displayed is not performed, the processing unit calculates a distance between a position of a viewed point on a display screen identified on a basis of the line-of-sight information and a position of the target object on the display screen, and performs processing of maintaining a layout of the already displayed display object on a basis of the calculated distance.

(II-15)

The information processing apparatus according to any one of (II-1) to (II-14), in which the processing unit causes the selected display object to be superimposed and displayed on a real space or an image showing a real space.

(II-16)

An information processing method to be executed by an information processing apparatus, including:

a step of performing processing of causing a display object that is selected from among a plurality of candidates for the display object corresponding to a target object on a basis of line-of-sight information showing a line of sight of a user to be displayed, in which a manner of display of the display object changes on a basis of the line-of-sight information.

(II-17)

A program for causing a computer system to execute a function of performing processing of causing a display object that is selected from among a plurality of candidates for the display object corresponding to a target object on a basis of line-of-sight information showing a line of sight of a user to be displayed, in which a manner of display of the display object changes on a basis of the line-of-sight information by the function of performing the processing of causing the display object to be displayed.

REFERENCE SIGNS LIST

100 information processing apparatus
102 communication unit
104 control unit
110 processing unit

The invention claimed is:

1. An information processing apparatus, comprising:
   a central processing unit (CPU) configured to:
      select a display object from a plurality of candidate objects, wherein
         each of the plurality of candidate objects includes attribute information that indicates a degree of priority,
         the selected display object corresponds to a specific position in a visual field of a user of the information processing apparatus, and
         the degree of priority of the selected display object is highest from among degree of priorities of the plurality of candidate objects; and
      control a display screen to display the selected display object based on line-of-sight information that indicates a line of sight of the user, wherein the selected display object is displayed in association with the specific position; and
      change a manner of the display of the selected display object based on the attribute information of the selected display object.

2. The information processing apparatus according to claim 1, wherein the CPU is further configured to change the manner of display of the selected display object based on the line-of-sight information.

3. The information processing apparatus according to claim 2,
wherein the CPU is further configured to change the manner of the display of the selected display object based on a change of at least one of a layout of the display object, a manner of ornamentation on the selected display object, and a manner of omission of the selected display object.

4. An information processing apparatus, comprising:
a central processing unit (CPU) configured to:
select a display object from a plurality of candidate objects,
wherein the selected display object corresponds to a specific position in a visual field of a user of the information processing apparatus;
control a display screen to display the selected display object, wherein
the selected display object is displayed in association with the specific position, and
the selected display object is displayed based on line-of-sight information that indicates a line of sight of the user; and
change a manner of the display of the selected display object based on the line-of-sight information and state information, wherein the state information indicates at least one of a locomotion state of the user or a conversation state of the user.

5. The information processing apparatus according to claim 1,
wherein the CPU is further configured to determine the manner of the display of the selected display object based on an assessment that the attribute information of the selected display object includes text information or the attribute information of the selected display object excludes the text information.

6. The information processing apparatus according to claim 5,
wherein, based on the line-of-sight information and the attribute information that includes the text information, the CPU is further configured to change a number of displayed characters of the text information.

7. The information processing apparatus according to claim 5,
wherein, based on the line-of-sight information and the attribute information that includes the text information, the CPU is further configured to highlight the text information.

8. The information processing apparatus according to claim 1, wherein the CPU is further configured to:
determine a position of a viewed point based on the line-of-sight information;
determine a relationship between the position of the viewed point and the specific position; and
select the display object corresponding to the specific position based on the relationship between the position of the viewed point and the specific position.

9. An information processing apparatus, comprising:
a central processing unit (CPU) configured to:
determine a position of a viewed point based on line-of-sight information that indicates a line of sight of a user of the information processing apparatus;
determine a relationship between the position of the viewed point and a specific position;
select a first display object from a plurality of candidate objects based on the relationship between the position of the viewed point and the specific position and an assessment that a distance between the position of the viewed point and the specific position is less than or equal to a first value, or the distance between the position of the viewed point and the specific position is larger than the first value and less than or equal to a second value,
wherein the selected first display object corresponds to the specific position in a visual field of the user; and
control a display screen to display the selected first display object based on the line-of-sight information, wherein the selected first display object is displayed in association with the specific position.

10. The information processing apparatus according to claim 9, wherein
the CPU is further configured to prohibit selection of a second display object of the plurality of candidate objects based on the assessment that the distance between the position of the viewed point and the specific position is larger than the first value and less than or equal to the second value, and
the second display object includes text information.

11. The information processing apparatus according to claim 9,
wherein the first value and the second value are based on a visual field characteristic.

12. An information processing apparatus, comprising:
a central processing unit (CPU) configured to:
determine a position of a viewed point based on line-of-sight information that indicates a line of sight of a user of the information processing apparatus;
determine a relationship between the position of the viewed point and a specific position;
select a display object from a plurality of candidate objects based on the relationship between the position of the viewed point and the specific position,
wherein the selected display object corresponds to the specific position in a visual field of the user;
determine a display range of a display screen for display of the selected display object, wherein the display range is determined based on the relationship between the position of the viewed point and the specific position;
limit placement of the selected display object on the display screen, based on a visual field characteristic and the determined display range; and
control the display screen to display the selected display object based on the line-of-sight information, wherein the selected display object is displayed in association with the specific position.

13. The information processing apparatus according to claim 1,
wherein the CPU is further configured to:
detect a target object corresponding to the specific position, and
control the display based on detection of the target object.

14. An information processing apparatus, comprising:
a central processing unit (CPU) configured to:
select a first display object from a plurality of candidate objects,
wherein the selected first display object corresponds to a specific position in a visual field of a user of the information processing apparatus;
control a display screen to display the selected display object based on line-of-sight information that indicates a line of sight of the user, wherein the display screen is controlled at a first time interval longer than a second time interval, and the second time interval corresponds to display of a frame; and maintain a layout of a second display object in a third time interval in which the display control is not performed.

15. The information processing apparatus according to claim 14, wherein the CPU is further configured to maintain the layout based on a distance between a position of a viewed point and the specific position, and the distance is identified based on the line-of-sight information.

16. The information processing apparatus according to claim 1, wherein the CPU is further configured to superimpose and display the selected display object on a real space or an image showing the real space.

17. An information processing method, comprising:

selecting a display object from a plurality of candidate objects, wherein each of the plurality of candidate objects includes attribute information that indicates a degree of priority, the selected display object corresponds to a specific position in a visual field of a user, and the degree of priority of the selected display object is highest from among degree of priorities of the plurality of candidate objects;

controlling a display screen to display the selected display object based on line-of-sight information that indicates a line of sight of the user, wherein the selected display object is displayed in association with the specific position; and changing a manner of the display of the selected display object based on the attribute information of the selected display object.

* * * * *